United States Patent
Marcel

(10) Patent No.: US 6,564,666 B1
(45) Date of Patent: May 20, 2003

(54) GEAR MOTOR FOR DRIVING VEHICLE EQUIPMENT WITH ELIMINATION OF TRANSMISSION LINE AXIAL PLAY

(75) Inventor: Nomerange Herve Marcel, Caen (FR)

(73) Assignee: Meritor Light Vehicle Systems-France, Sully-sur-Loire (FR)

( * ) Notice: Subject to any disclaimer, the term of this patent is extended or adjusted under 35 U.S.C. 154(b) by 0 days.

(21) Appl. No.: 09/554,959

(22) PCT Filed: Nov. 25, 1998

(86) PCT No.: PCT/FR98/02531

§ 371 (c)(1),
(2), (4) Date: Aug. 22, 2000

(87) PCT Pub. No.: WO97/43564

PCT Pub. Date: Nov. 20, 1997

(30) Foreign Application Priority Data

Nov. 27, 1997 (FR) .............................. 97 14950

(51) Int. Cl.⁷ ............................................. F16H 55/24
(52) U.S. Cl. ........................................... 74/425; 74/402
(58) Field of Search .................................. 74/402, 455

(56) References Cited

U.S. PATENT DOCUMENTS 4,790,202 A * 12/1988 Hayashi et al. ............... 74/396
5,212,999 A * 5/1993 Kitada ........................ 74/425
5,213,000 A * 5/1993 Saya et al. .................... 74/425
5,325,736 A * 7/1994 Tsujita ........................ 74/425
5,777,411 A * 7/1998 Nakajima et al. ............. 310/83
6,393,929 B1   5/2002 Quere et al.

FOREIGN PATENT DOCUMENTS

DE     37 44274 A1 * 7/1989 ............ H02K/7/12
WO     WO 97/43564  * 11/1997 ............ F16H/1/16

* cited by examiner

Primary Examiner—Thomas R. Hannon
Assistant Examiner—Timothy McAnulty
(74) Attorney, Agent, or Firm—Carlson, Gaskey & Olds P.C.

(57) ABSTRACT

A reducing motor including a rotor with an armature shaft, a reducer housing (2) containing a gear wheel (3) engaging a worm on the shaft, and a shock absorber (5) housed in the gear wheel and rotationally integral therewith. The unitary shock absorber has circumferential notches (8) engageable both by radial flanges 87) on the gear wheel and by elements (10) for driving an output member (11), and chamfers (90) are provided on the edges of the notches to ensure gradual torque-dependent angular deflection of the shock absorber and make it easier to mount the same automatically on the hub of the gear wheel.

11 Claims, 5 Drawing Sheets

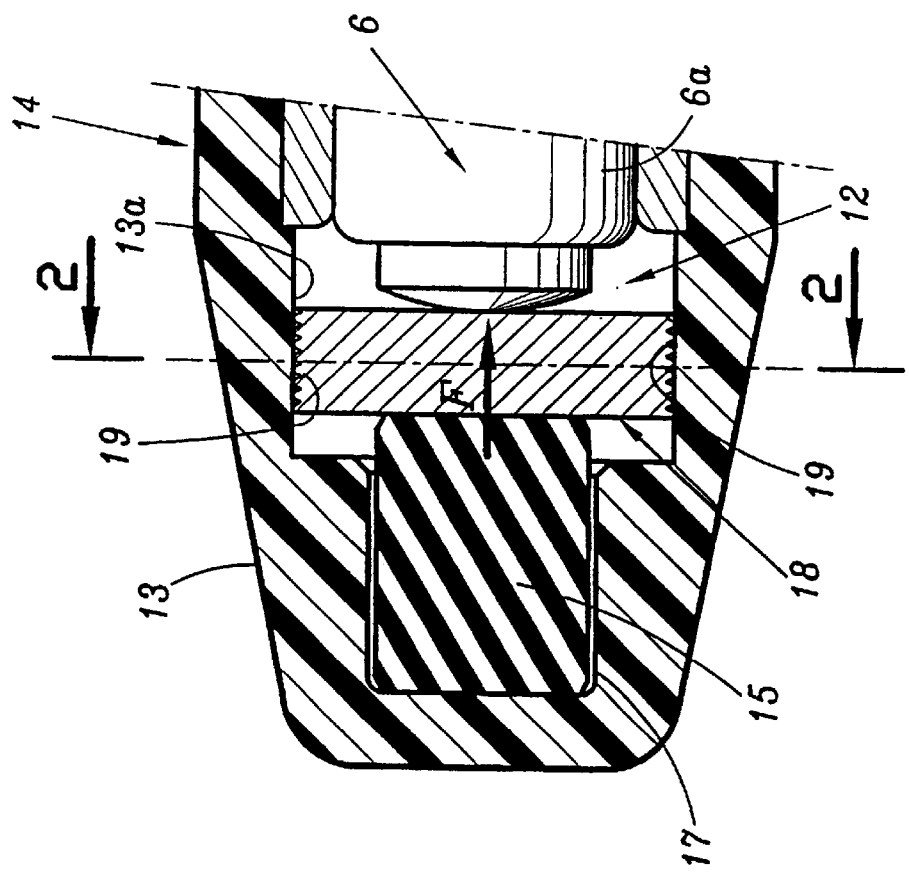
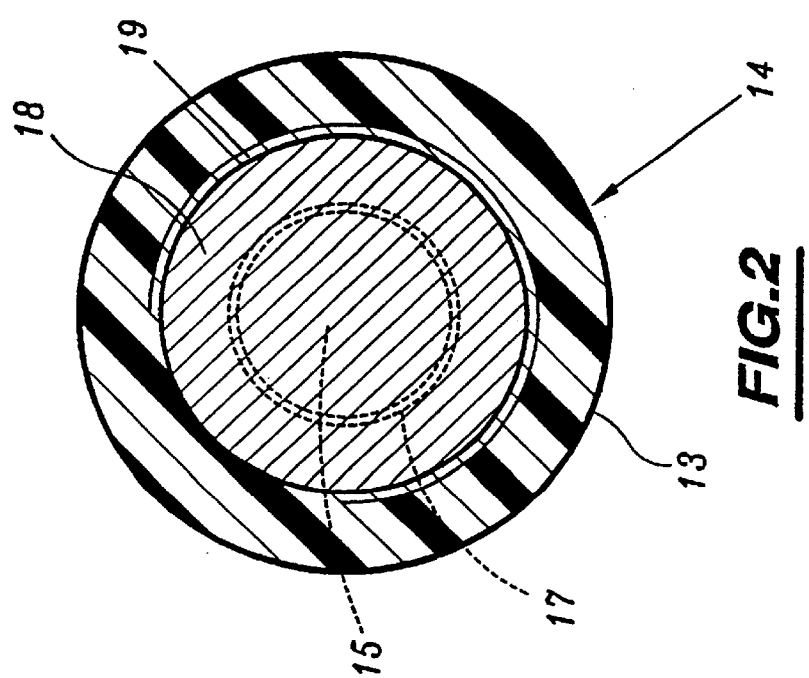

GEAR MOTOR FOR DRIVING VEHICLE EQUIPMENT WITH ELIMINATION OF TRANSMISSION LINE AXIAL PLAY

BACKGROUND OF THE INVENTION

The subject of the present invention is a geared motor unit, particularly for driving vehicle equipment such as window lifters, sunroofs, etc, and of the type comprising a rotor equipped with a rotor shaft, a reduction gearbox which contains a gearwheel in mesh with a worm belonging to the shaft and capable of driving an output member.

Geared motor units of this type are normally equipped with means for adjusting the axial play between one end of the rotor shaft and the wall of the box. This is because the axial play in the driveline mounted in the geared motor unit is due to the combination of dimensional spreads on the various parts on assembly (shaft, endstop, box, etc.) which, placed end to end, are not as long as their housing.

Hitherto this axial play has been compensated for manually using a screw housed in the end of the box facing the rotor shaft hole and which is immobilized by an adhesive which at the same time provides sealing. Such a method of adjustment is lengthy to perform, expensive, and increases the overall cost of manufacture of the geared motor unit.

It is also known practice (see U.S. Pat. No. 5,169,245) to achieve automatic compensation for the axial play in the driveline of the geared motor unit using a coil spring resting in an axial housing of the end of the box, and a system of end stops designed to limit the compressive axial loading experienced by the coil spring to a predetermined value. This limitation is achieved by a shoulder on the inside of the wall of the box, and against which a piston inserted between the end of the shaft and the coil spring abuts.

Patent Abstracts of Japan Vol. 018 No. 297 of 7.6.1994 also discloses a geared motor unit in which an end stop, fixed by welding to one end of the box, eliminates any axial play between the rotor shaft and the wall of the box.

These devices for compensating for the axial play have a drawback which lies in the fact that they are not able to eliminate the troublesome noise of the shaft which is caused when it changes its direction of rotation.

SUMMARY OF THE INVENTION

The object of the invention is therefore to eliminate this drawback by arranging the geared motor unit in such a way that these noises are completely eliminated.

According to the invention, the geared motor unit comprises means for eliminating, under a given compressive axial preload, any axial play between one end of the rotor shaft and the wall of the box.

According to one embodiment of the invention, the said means comprise a plug housed in the end of the box, and a piston inserted between the plug and the end of the shaft, the plug exerting the said compressive axial preload, set at the time of assembly, on the piston and on the shaft, and the box by melting the plastic of which the box is made into the said roughnesses; this melting may be obtained, for example, using a sonotrode, an ultrasonic-welding machine, or alternatively by high-frequency welding.

According to another possible embodiment of the invention, the geared motor unit comprises a metal plug mounted so that it can slide in an axial housing formed in the wall of the box facing the end of the shaft; irregularities are arranged on the surface of this plug in contact with the wall of the housing, and the plug is moved axially until it comes into abutment against the end of the shaft under a given compressive axial preload thrust, then immobilized in this position so as to eliminate any shaft play.

This type of embodiment therefore has no piston, the plug alone fulfilling the function of plug and piston of the previous embodiment, and being immobilized in the desired position to exert appropriate axial thrust on the shaft.

The basic idea underlying the invention therefore consists in eliminating the axial play left in geared motor units of the state of the prior art and in doing so under a given compressive axial preload or thrust, for example of the order of 100 newtons.

BRIEF DESCRIPTION OF THE DRAWINGS

Other specific features and advantages of the invention will become apparent during the course of the description which will follow, which is given with reference to the appended drawings which illustrate a number of embodiments thereof by way of non-limiting examples.

FIG. 2 is a view in cross section on 2/2 of FIG. 3, illustrating a first embodiment of the gear motor unit according to the invention.

FIG. 3 is a view in partial longitudinal section showing one end of the geared motor unit of FIG. 1 equipped with a device for eliminating the axial play of the shaft according to a first embodiment of the invention.

DETAILED DESCRIPTION OF THE PREFERRED EMBODIMENT

Figure 1:
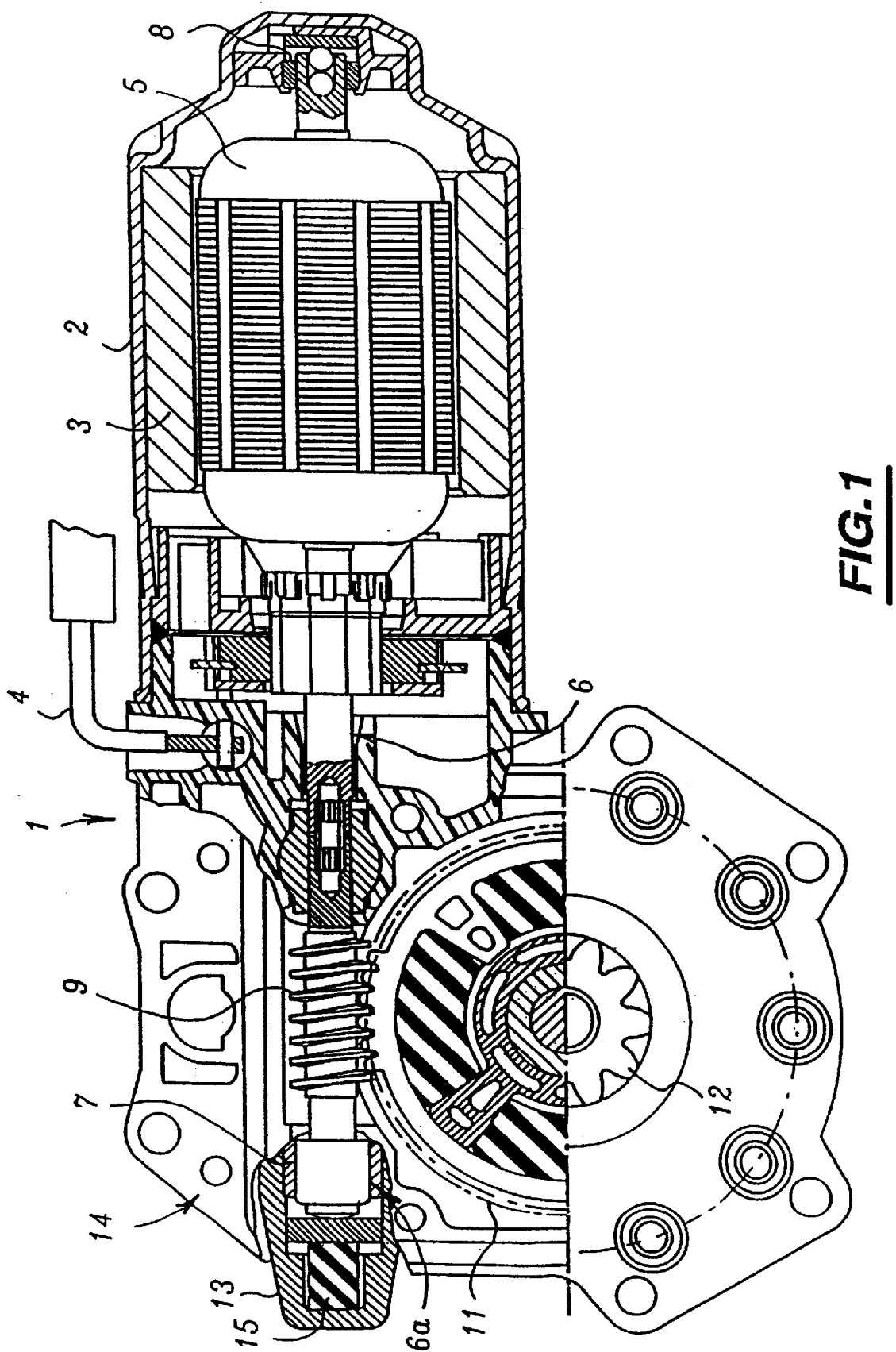
FIG. 1 is a view in longitudinal elevation and part section of a geared motor unit for driving motor vehicle equipment, equipped with a device for eliminating the axial play in its driveline according to the invention.

The geared motor unit 1 illustrated in FIG. 1 is intended, in particular, for driving vehicle equipment such as electric window lifters.

It comprises, housed inside a casing 2, a stator 3 which can be powered by electrical connections 4 in the known way, a rotor 5 equipped with a rotor shaft 6, the ends of which are mounted in rolling bearings 7, 8. This rotor shaft carries a worm 9 in mesh with a gearwheel 11 capable of driving an output member 12 which itself drives the equipment associated with the geared motor unit, for example a window lifter, a sunroof, etc.

The end 6a of the rotor shaft 6 passing through the bearing 7, located near the worm 9 collaborates with a device 12 making it possible, under a given compressive axial preload F (FIG. 3) to eliminate any axial play between the end 6a of the shaft 6 and the wall 13 of the reduction gearbox 14.

In the embodiment illustrated in FIGS. 2 and 3, the means which constitute the device 12 comprise a plug 15 made of an elastic material such as an elastomer, arranged in a terminal housing 17 at the end of the wall 13 and projecting axially from this housing 17, towards the end 6a of the shaft 6. The device 12 also comprises a piston 18 inserted between the plug 15 and the end 6a of the shaft 6. Arranged on the peripheral surface of the piston 18, in contact with the interior wall 13a of the end 13 of the box 14 are irregularities such as circular grooves 19 or, alternatively, a screw thread, notching, axial grooves, knurling, etc., the piston 18 being made of metal, whereas the box 14 is made of plastic.

When the geared motor unit is assembled, the piston 18 is pressed against the plug 15, precompressing it so that it exerts a compressive axial preload thrust F of an appropriate value, such as about 100 newtons, on the piston 18 and on the end 6a of the shaft 6.

Once this compressive preload F has been set to the desired value, the piston 18 is immobilized in the axial position that corresponds to the said compressive preload of the plug 15, and this is done by heating the plastic of the end 13 of the box 14 facing the surface irregularities of the piston 18, so that the molten plastic fills its grooves or channels 19. Subsequent solidification of the plastic by cooling fixes the piston 18 permanently in this position at the end 13 of the box 14. This melting of the plastic may be brought about by appropriate means, not depicted, such as an ultrasound generator or using high-frequency welding.

Once the piston 18 has been secured to the box 14 in this way, changes in direction of rotation of the rotor shaft 6 can no longer cause this shaft to move axially and therefore can no longer generate troublesome noise.

Figure 4:
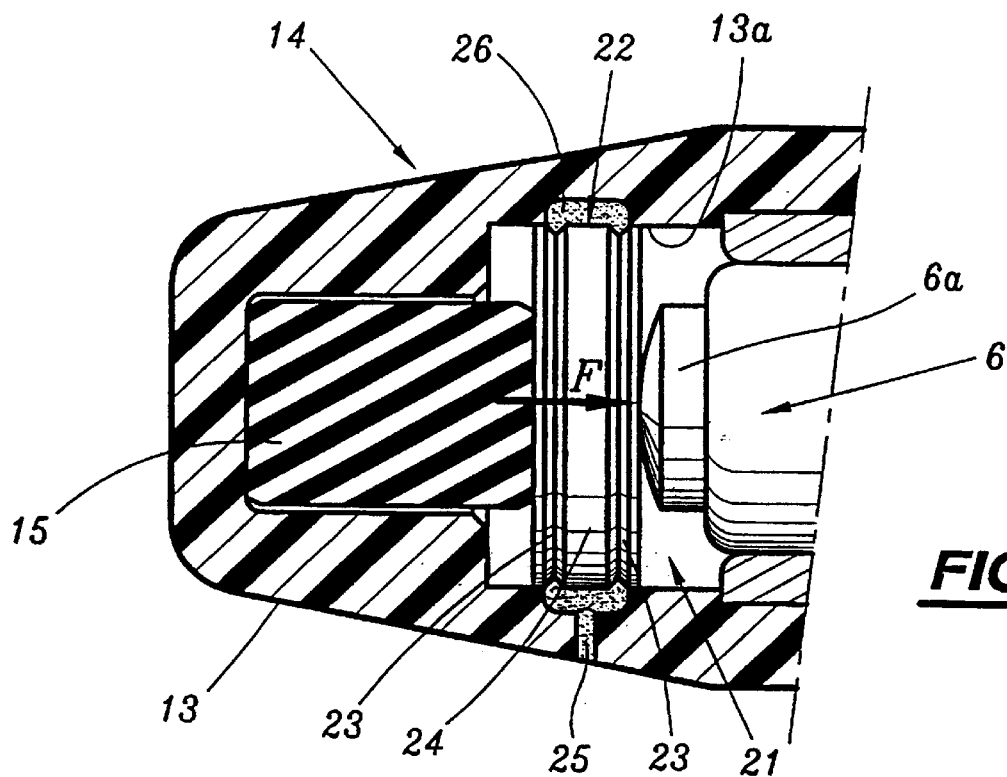
FIG. 4 is a view in partial longitudinal section similar to FIG. 3 illustrating a second embodiment of the device for eliminating axial play in the geared motor unit according to the invention.

In the second embodiment illustrated in FIG. 4, the device 21 comprises a piston 22, the peripheral surface irregularities of which, in contact with the interior wall 13a, consist of two circular channels 23 formed on the edges of the piston 22 and separated by a cylindrical region 14. Correspondingly, at least one duct 25 is arranged to the side of the piston 22 in the wall 13 of the box 14 and opens into an annular chamber 26 in the wall 13, this chamber 26 itself opening onto the circular grooves 23.

This device 21 for eliminating axial play in the shaft 6 is adjusted as follows: first of all, the compressive axial preload F of the plug 15 is adjusted to the desired value, so that the piston 22 is positioned exactly at the appropriate axial location, opposite the chamber 26. Next, a liquid adhesive is injected into the lateral duct 25 so that it fills the chamber 26 and the channels 23. The pressure with which the liquid adhesive is injected is arbitrary. After hardening, the adhesive entirely fills the channels 23, the chamber 26 and the duct 25 thus hermetically sealed and immobilizes the piston 22 with respect to the wall 13 of the box 14. As before, the piston 22 eliminates any axial play of the rotor shaft 6 and therefore any parasitic noise as the shaft changes direction of rotation.

Figure 5:
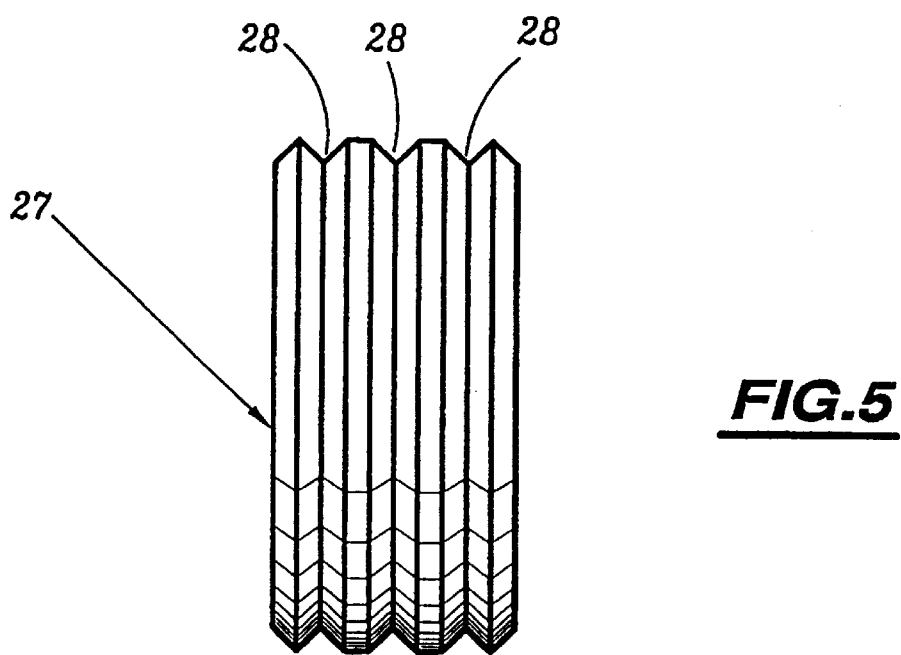
FIG. 5 is a view in side elevation of an alternative form of the piston of FIGS. 3 and 4.

In the alternative form of FIG. 5, the piston 27 has three circular channels 28, the central cylindrical region 24 having been omitted. In other respects, the use of the piston 27 is entirely similar to that of the piston 22.

Figure 6:
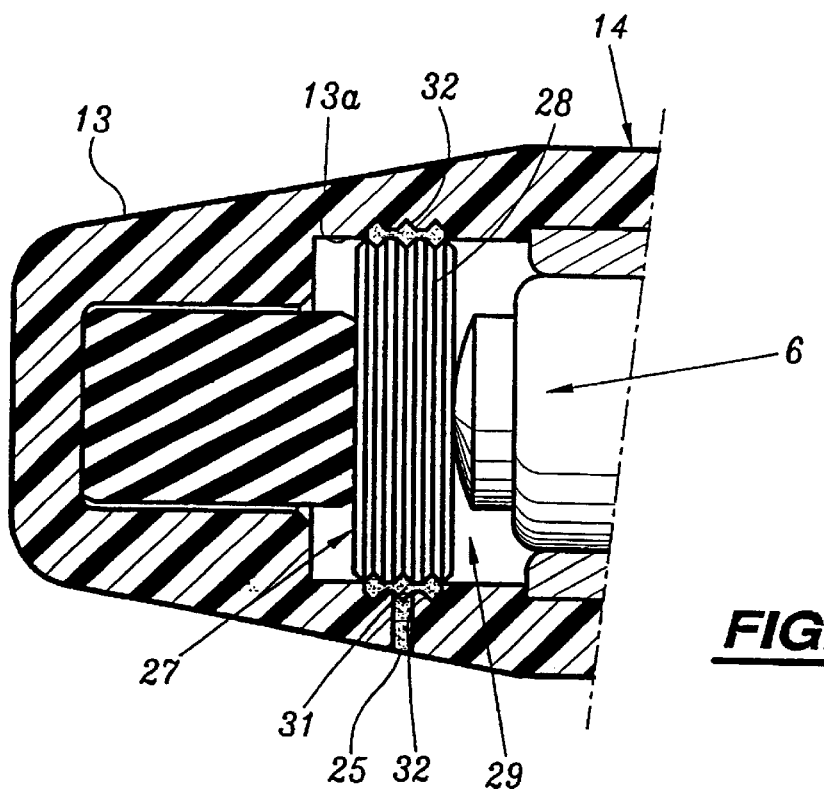
FIGS. 6, 7 and 8 are views similar to FIG. 3 of three other embodiments of the device for eliminating axial play at which the invention is intended.

In the alternative form of FIG. 6, the device 29 for eliminating the axial play of the shaft 6 comprises a piston 27 with a number of circular channels 28 and a peripheral counterbore 31 which is shaped so as to delimit, facing the channels 28, complementary channels 32 which are formed in the wall 13 of the box 14. This counterbore 31 and the grooves 28 can be filled with liquid adhesive via the side duct 25, the piston 27 being immobilized by the solidified adhesive.

Figure 7:
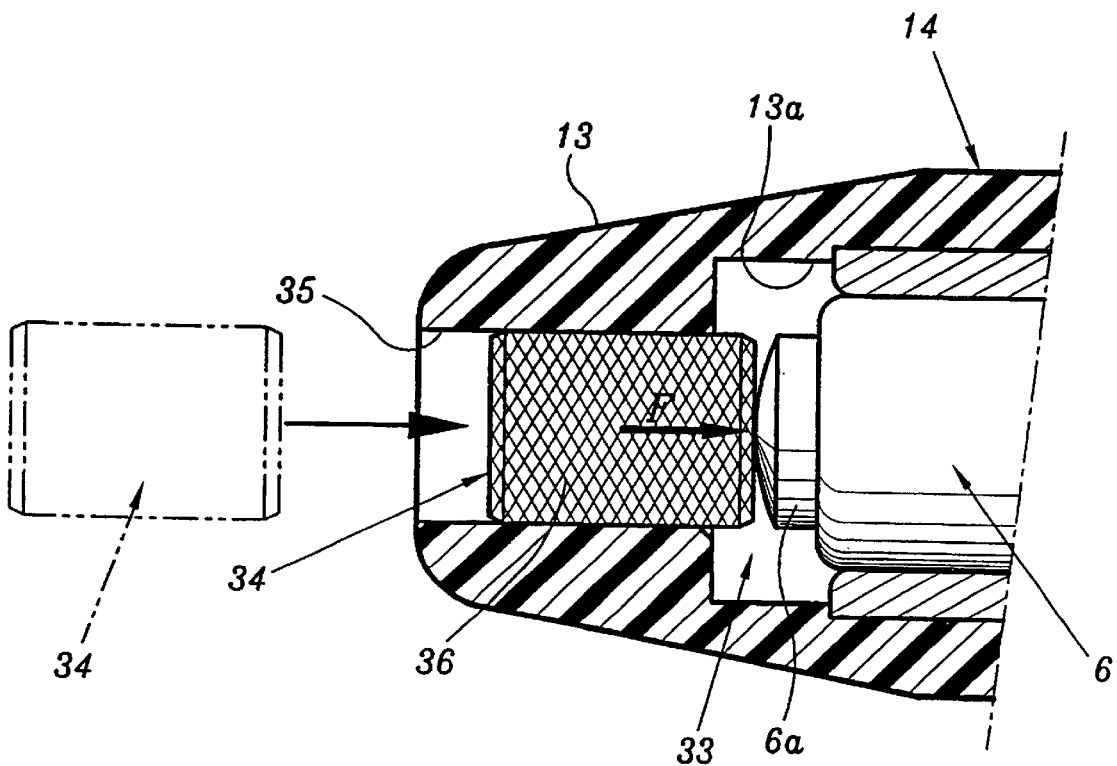

FIG. 7 illustrates a fourth embodiment of the invention in which the device 33 for eliminating the play of the shaft 6 comprises a metal plug 34 with a diameter greater than the diameter of the axial housing 35 formed in the wall 13 of the reduction gearbox 14 facing the end 6a of the shaft 6. There are irregularities 36 on the surface of this plug 34 in contact with the wall of the housing 35, for example knurling as depicted, or alternatively notching, etc.

The plug 34 is moved axially in the housing 35 by melting the plastic of the wall 13 using means which are known and have not been depicted, until this plug comes into abutment against the end 6a of the shaft 6 with a given compressive axial preload thrust F (for example 100 newtons). The position of the plug 34 before it is introduced is depicted in chain line in FIG. 7.

The plug 34 is positioned axially at the precise desired location in order to place the shaft 6 under compressive preload using an ultrasonic-welding machine which causes the plastic of the wall 13 of the housing 35 to melt into the surface irregularities 36. This machine is associated with a thrusting ram which defines the amount of compressive preload on the driveline. Immobilization is achieved by the hardening of the plastic when the ultrasonic transducer has been shut down.

Figure 8:
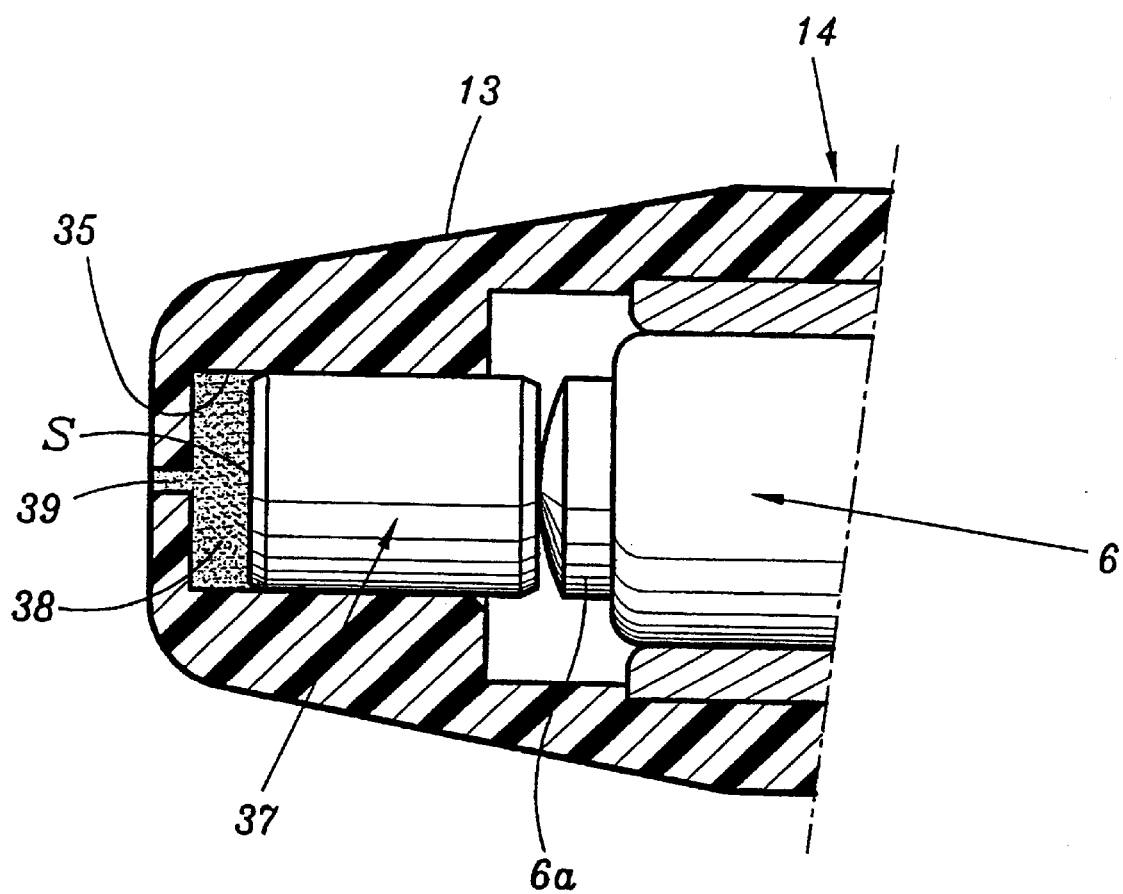

FIG. 8 illustrates a fifth embodiment which constitutes an alternative form of FIG. 7, in which the plug 37, preferably made of metal, has a smooth surface and is immobilized in its axial position, compressed against the end 6a of the shaft 6, by solidified adhesive 38. The latter is injected in the liquid state through an axial nozzle 39 formed in the wall 13 of the box 14 and which opens into the housing 35. The liquid adhesive is injected under a given pressure and fills that part of the housing 35 which is located behind the plug 37.

Use is made, for example, of a hot-melt adhesive, which melts at a temperature lower than the melting point of the plastic of which the box 14 is made (200° C.) at low pressure.

By way of an unlimiting numerical example, if the axial thrust F is 100 newtons, and the cross-sectional area S of the plug 37 is equal to 0.5 cm$^2$, the pressure with which the adhesive is injected must be equal to 20 bar.

Injecting a plastic identical to that of the box 14 is difficult to envisage because it would have to be done at high pressure, which would entail a plug 37 of very low cross section.

The invention is not restricted to the embodiments described and its execution may be varied in a number of ways. Thus, the embodiment of FIG. 8 could be modified by completely opening the housing 35 to the outside of the box 14 as depicted in FIG. 7, by arranging surface irregularities (grooves, knurling, etc.) on the surface of the plug 37 and by forming a side nozzle and a counterbore in the wall 13 of the box 14 so that liquid adhesive can be injected against the periphery of the plug 37 once the plug has been correctly axially positioned at the desired location. To perform this positioning operation, the plug 37 is pushed by an exterior precompression ram and immobilized by injecting adhesive into its grooves, via the counterbore in the box.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specially described. For that reason the following claims should be studied to determine the true scope and content of this invention.

What is claimed is:

1. A geared motor unit, for driving vehicle equipment, comprising: a rotor equipped with a rotor shaft, a reduction gearbox which contains a gearwheel in mesh with a worm belonging to the shaft and capable of driving an output member, and a device for eliminating, under a given compressive axial preload, axial play between one end of the rotor shaft and a wall of the box, wherein the device includes a plug housed in an end of the box, and a piston inserted between the plug and the end of the shaft, the plug exerting the compressive axial preload on the piston and on the shaft, and an immobilization system for immobilizing the piston in the axial position that corresponds to the compressive preload.

2. The geared motor unit according to claim 1, wherein the immobilization system for immobilizing the piston in the axial position include irregularities formed on a surface of the piston in contact with the wall of the box, the piston being made of metal and the box being made of plastic, and the piston is immobilized with respect to the wall of the box by melting the box into the irregularities.

3. The gear motor unit according to claim 2, wherein the irregularities are grooves.

4. The gear motor unit according to claim 2, wherein the box is melted into the irregularities by using ultrasound.

5. The gear motor unit according to claim 2, wherein the box is melted into the irregularities by using high-frequency welding.

6. The geared motor unit according to claim 1, wherein the immobilization system for immobilizing the piston includes surface irregularities formed on the surface of the piston in contact with the wall of the box, at least one duct arranged to a side of the piston in the wall of the box and opening into a chamber of the wall, and hardened adhesive injected in a liquid state through the duct into the surface irregularities.

7. A geared motor unit, for driving vehicle equipment, comprising: a rotor equipped with a rotor shaft, a reduction gearbox which contains a gearwheel in mesh with a worm belonging to the shaft and capable of driving an output member, and a device for eliminating, under a given compressive axial preload, axial play between one end of the rotor shaft and a wall of the box, wherein the device includes a plug housed in an end of the box, and a piston inserted between the plug and the end of the shaft, the plug exerting the compressive axial preload on the piston and on the shaft, and an immobilization system for immobilizing the piston in the axial position that corresponds to the compressive preload including irregularities formed on a surface of the piston in contact with the wall of the box, and a securing material enters the irregularities to immobilize the piston with respect to the wall of the box.

8. The geared motor unit according to claim 7, wherein the piston is made of metal and the box is made of plastic, and the piston is immobilized with respect to the wall of the box by melting the box, the melted plastic of the box providing the securing material.

9. A geared motor unit, for driving vehicle equipment, comprising: a rotor equipped with a rotor shaft, a reduction gearbox which contains a gearwheel in mesh with a worn belonging to the shaft and capable of driving an output member, and a device for eliminating, under a given compressive axial preload, axial play between one end of the rotor shaft and a wall of the box, wherein the device includes a plug housed in an end of the box, and a piston inserted between the plug and the end of the shaft, the plug exerting the compressive axial preload on the piston and on the shaft, and an immobilization system for immobilizing the piston in the axial position that corresponds to the compressive preload, wherein the immobilization system for immobilizing the piston includes surface irregularities formed on the surface of the piston in contact with the wall of the box, at least one duct arranged to a side of the piston in the wall of the box and opening into a chamber of the wall and hardened adhesive injected in a liquid state through the duct into the surface irregularities, and the surface irregularities are channels arranged on a peripheral surface of the piston in contact with the wall of the box.

10. A geared motor unit, for driving vehicle equipment, comprising: a rotor equipped with a rotor shaft, a reduction gearbox which contains a gearwheel in mesh with a worm belonging to the shaft and capable of driving an output member, and a device for eliminating, under a given compressive axial preload, axial play between one end of the rotor shaft and a wall of the box, wherein the device includes a plug housed in an end of the box, and a piston inserted between the plug and the end of the shaft, the plug exerting the compressive axial preload on the piston and on the shaft, and an immobilization system for immobilizing the piston in the axial position that corresponds to the compressive preload, wherein the immobilization system for immobilizing the piston includes surface irregularities formed on the surface of the piston in contact with the wall of the box, at least one duct arranged to a side of the piston in the wall of the box and opening into a chamber of the wall, and hardened adhesive injected in a liquid state through the duct into the surface irregularities, and a nozzle opens into a counterbore and complementary channels are formed in the wall of the box around the piston and the hardened adhesive is injected into the surface irregularities and the complementary channels.

11. A geared motor unit, for driving vehicle equipment, comprising: a rotor equipped with a rotor shaft, a reduction gearbox which contains a gearwheel in mesh with a worm belonging to the shaft and capable of driving an output member, and a device for eliminating, under a given compressive axial preload, axial play between one end of the rotor shaft and a wall of the box, wherein the device includes a plug housed in an end of the box, and a piston inserted between the plug and the end of the shaft, the plug exerting the compressive axial preload on the piston and on the shaft, and an immobilization system for immobilizing the piston in the axial position that corresponds to the compressive preload including irregularities formed on a surface of the piston in contact with the wall of the box, and a securing material enters the irregularities to immobilize the piston with respect to the wall of the box, and at least one duct is arranged to a side of the piston in the wall of the box and opens into a chamber of the wall, and the securing material is a hardened adhesive injected in a liquid state through the duct.

* * * * *

UNITED STATES PATENT AND TRADEMARK OFFICE
CERTIFICATE OF CORRECTION

PATENT NO. : 6,564,666 B1
DATED : May 20, 2003
INVENTOR(S) : Nomerange Herve Marcel It is certified that error appears in the above-identified patent and that said Letters Patent is hereby corrected as shown below:

<u>Column 5,</u>
Line 60, "worn" should be -- worm --.

Signed and Sealed this

Second Day of September, 2003

JAMES E. ROGAN
*Director of the United States Patent and Trademark Office*